(12) United States Patent
Yasugi et al.

(10) Patent No.: US 10,713,829 B2
(45) Date of Patent: Jul. 14, 2020

(54) ACCIDENT REPORT DEVICE AND ACCIDENT REPORT METHOD

(71) Applicant: DENSO TEN Limited, Kobe-shi, Hyogo (JP)

(72) Inventors: Sho Yasugi, Okayama (JP); Koichi Yamamoto, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 0 days.

(21) Appl. No.: 16/357,933

(22) Filed: Mar. 19, 2019

(65) Prior Publication Data
US 2020/0031299 A1 Jan. 30, 2020

(30) Foreign Application Priority Data
Jul. 25, 2018 (JP) .................... 2018-139669

(51) Int. Cl.
| | | |
|---|---|---|
| *G06T 11/60* | (2006.01) | |
| *B60R 21/013* | (2006.01) | |
| *B60R 21/0136* | (2006.01) | |
| *G07C 5/08* | (2006.01) | |
| *H04N 5/247* | (2006.01) | |
| *G06T 19/20* | (2011.01) | |
| *G06T 19/00* | (2011.01) | |

(52) U.S. Cl.
CPC ............ *G06T 11/60* (2013.01); *B60R 21/013* (2013.01); *B60R 21/0136* (2013.01); *G06T 19/006* (2013.01); *G06T 19/20* (2013.01); *G07C 5/0866* (2013.01); *H04N 5/247* (2013.01)

(58) Field of Classification Search
None
See application file for complete search history.

(56) References Cited

U.S. PATENT DOCUMENTS 10,417,897 B1* 9/2019 Nave ................ B60W 30/0956
2016/0364842 A1* 12/2016 Kiyo ................ H04N 5/23293

FOREIGN PATENT DOCUMENTS

| JP | 2015-153001 A | 8/2015 |
| JP | 2016-030481 A | 3/2016 |
| WO | 2013/111492 A1 | 8/2013 |

\* cited by examiner

*Primary Examiner* — Jwalant Amin
(74) *Attorney, Agent, or Firm* — Oliff PLC

(57) ABSTRACT

An accident report device for reporting accident information to a predetermined report destination in a case where a vehicle is involved in an accident, includes: an image acquiring unit configured to acquire an image acquired by at least one vehicle-mounted camera mounted on the vehicle; an information acquiring unit configured to acquire information related to the vehicle; and an image control unit configured to control a terminal of the report destination such that the terminal displays a synthetic image generated based on the image, the synthetic image showing an area surrounding the vehicle and an external appearance of the vehicle as seen from a virtual viewpoint.

8 Claims, 12 Drawing Sheets

ACCIDENT REPORT DEVICE AND ACCIDENT REPORT METHOD

CROSS-REFERENCE TO RELATED APPLICATIONS

This application is based upon and claims the benefit of priority from prior Japanese patent application No. 2018-139669, filed on Jul. 25, 2018, the entire contents of which are incorporated herein by reference.

TECHNICAL FIELD

The present invention relates to an accident report device and an accident report method.

RELATED ART

Recently, various technologies for reporting accident information to a predetermined report destination when a vehicle accident occurs have been proposed. For example, a vehicle emergency report device proposed in JP-A-2016-30481 transmits seat occupant information of occupants, information on whether each occupant is wearing the seat belt, and an emergency report signal to a management center outside of a vehicle if occurrence of a vehicle accident is detected. Also, the vehicle emergency report device keeps an operation of repeatedly acquiring seat occupant information at predetermined time intervals and transmitting the seat occupant information to the management center, for a predetermined time for enabling estimation of the extent of injuries to each occupant, and an appropriate emergency treatment.

SUMMARY

When a vehicle accident occurs, it is difficult for the report destination to quickly and clearly grasp the condition of the vehicle and the area surrounding the vehicle.

Aspect of non-limiting embodiments of the present disclosure relates to provide a technology for making it possible for a report destination to quickly and clearly grasp the condition of a vehicle and the condition in the surrounding area of the vehicle when a vehicle accident occurs.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an accident report device for reporting accident information to a predetermined report destination in a case where a vehicle is involved in an accident, including: an image acquiring unit configured to acquire an image acquired by at least one vehicle-mounted camera mounted on the vehicle; an information acquiring unit configured to acquire information related to the vehicle; and an image control unit configured to control a terminal of the report destination such that the terminal displays a synthetic image generated based on the image, the synthetic image showing an area surrounding the vehicle and an external appearance of the vehicle as seen from a virtual viewpoint.

In the accident report device, the information acquiring unit may acquire seat occupant information of an occupant of the vehicle, and the image control unit may perform control such that an image of the vehicle, and a seat position mark indicating a seat position of the occupant are included in the synthetic image.

In the accident report device, the information acquiring unit may acquire information related to an impact applied to the vehicle, and, in a case where the seat occupant information after the impact is applied to the vehicle is different from the seat occupant information before the impact is applied to the vehicle, the image control unit may perform control such that the seat position mark in the synthetic image is displayed in a different form.

The accident report device may further include a priority deriving unit configured to derive a rescue priority for the occupant based on a position of the vehicle, the position being subjected to the impact, and the image control unit may perform control such that the rescue priority is displayed at the seat position in the synthetic image.

In the accident report device, the information acquiring unit may acquire information related to an impact applied to the vehicle, and the image control unit may perform control such that the synthetic image is generated based on the image acquired before the impact is applied.

In the accident report device, the image control unit may perform control such that an image of the vehicle and an impact mark representing a state of the impact are included in the synthetic image.

In the accident report device, the image control unit may perform control such that the impact mark is displayed in the synthetic image in a different form in accordance with a magnitude of the impact.

In the accident report device, the information acquiring unit may acquire information related to a posture of the vehicle, and the image control unit may perform control such that an image of the vehicle in the synthetic image is displayed in accordance with the posture of the vehicle.

According to another aspect of the present disclosure, there is provided an accident report method of reporting accident information to a predetermined report destination in a case where a vehicle is involved in an accident, including: acquiring an image acquired by at least one vehicle-mounted camera mounted on the vehicle; acquiring information related to the vehicle; and controlling a terminal of the report destination such that the terminal displays a synthetic image generated based on the image, the synthetic image showing an area surrounding the vehicle and an external appearance of the vehicle as seen from a virtual viewpoint.

According to the configuration of the present disclosure, it may be possible to check the surrounding area of the vehicle from images including the external appearance of the vehicle. Therefore, the report destination may quickly and clearly grasp the condition of the vehicle and the surrounding area of the vehicle.

BRIEF DESCRIPTION OF DRAWINGS

Exemplary embodiment(s) of the present invention will be described in detail based on the following figures, wherein.

DETAILED DESCRIPTION

Hereinafter, exemplary embodiments of the present invention will be described in detail with reference to the drawings. However, the present invention is not limited to the details of the embodiments described below.

Also, in the following description, in the straight traveling direction of a vehicle, the direction from the driver's seat toward the steering wheel will be referred to as the forward direction or the front side. In the straight traveling direction of the vehicle, the direction from the steering wheel toward the driver's seat will be referred to as the backward direction or the rear side. In the direction perpendicular to the straight traveling direction and vertical direction of the vehicle, the direction from the right side of the driver facing forward toward the left side will be referred to as the left direction. In the direction perpendicular to the straight traveling direction and vertical direction of the vehicle, the direction from the left side of the driver facing forward toward the right side will be referred to as the right direction.

1. Outline of Accident Report Device

Figure 1:
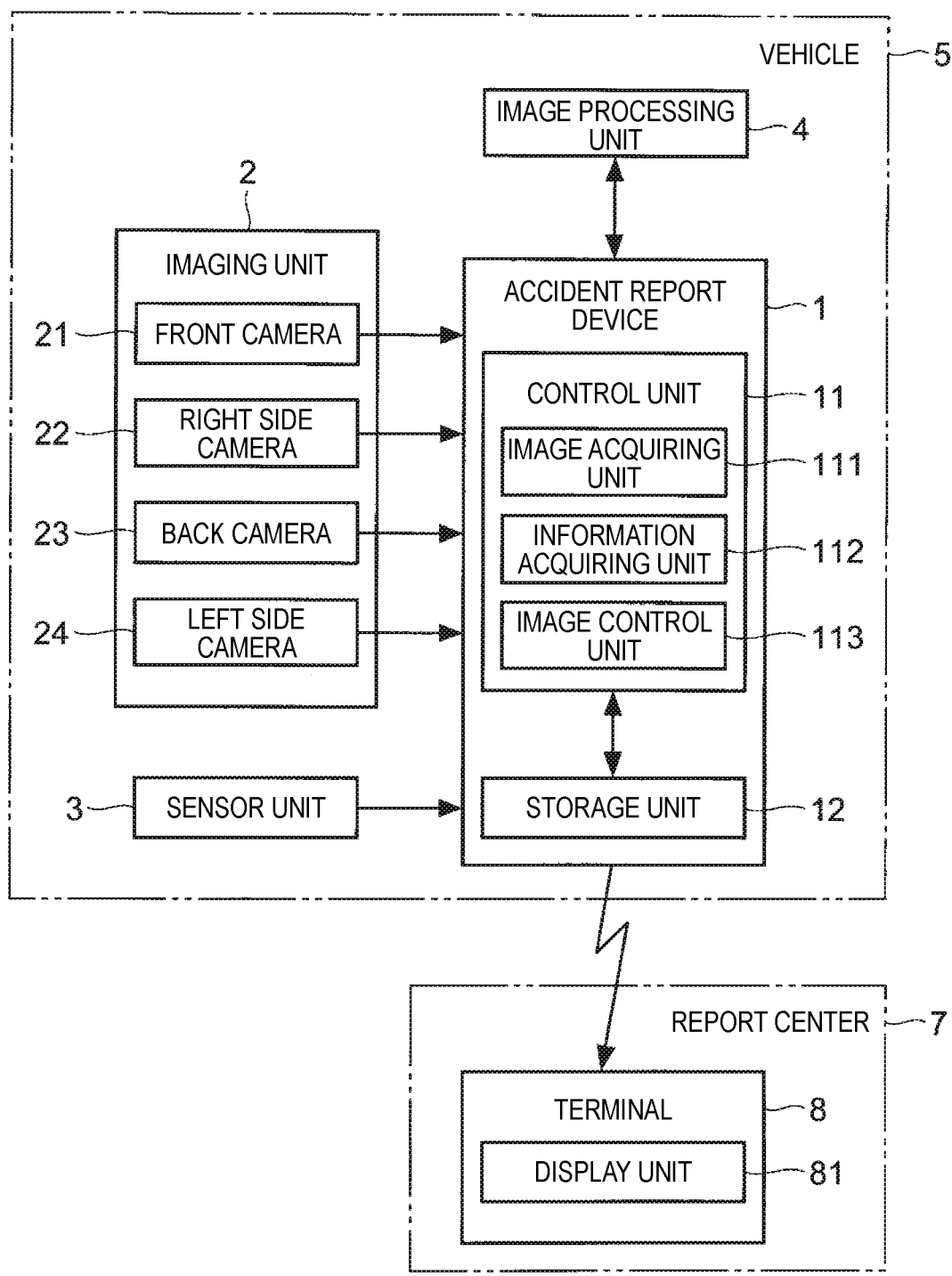
FIG. 1 is a block diagram illustrating the configuration of an accident report device of an embodiment.

FIG. 1 is a block diagram illustrating the configuration of an accident report device 1 of an embodiment. The accident report device 1 can be incorporated into, for example, a vehicle circumference monitoring system including an imaging unit 2, a sensor unit 3, and an image processing unit 4. The vehicle circumference monitoring system is a system for monitoring the condition in the surrounding area of a vehicle 5 equipped with the imaging unit 2 (vehicle-mounted cameras).

The accident report device 1 is a device for reporting accident information to a predetermined reportee when a vehicle accident occurs. The accident report device 1 can be provided to each vehicle equipped with vehicle-mounted cameras. The accident report device 1 reports information on an accident of the vehicle 5 to a report center 7 which is a reportee. According to the circumstances of an accident, for example, the report center 7 can urgently report the accident to a fire station, or request a road service to handle the accident. In the present embodiment, if a vehicle accident occurs, the accident report device 1 acquires images acquired by the vehicle-mounted cameras, and a variety of information on the vehicle 5, from the vehicle 5, and performs control such that images showing the condition of the vehicle 5 and condition in the surrounding area of the vehicle are displayed at the report center 7.

Figure 2:
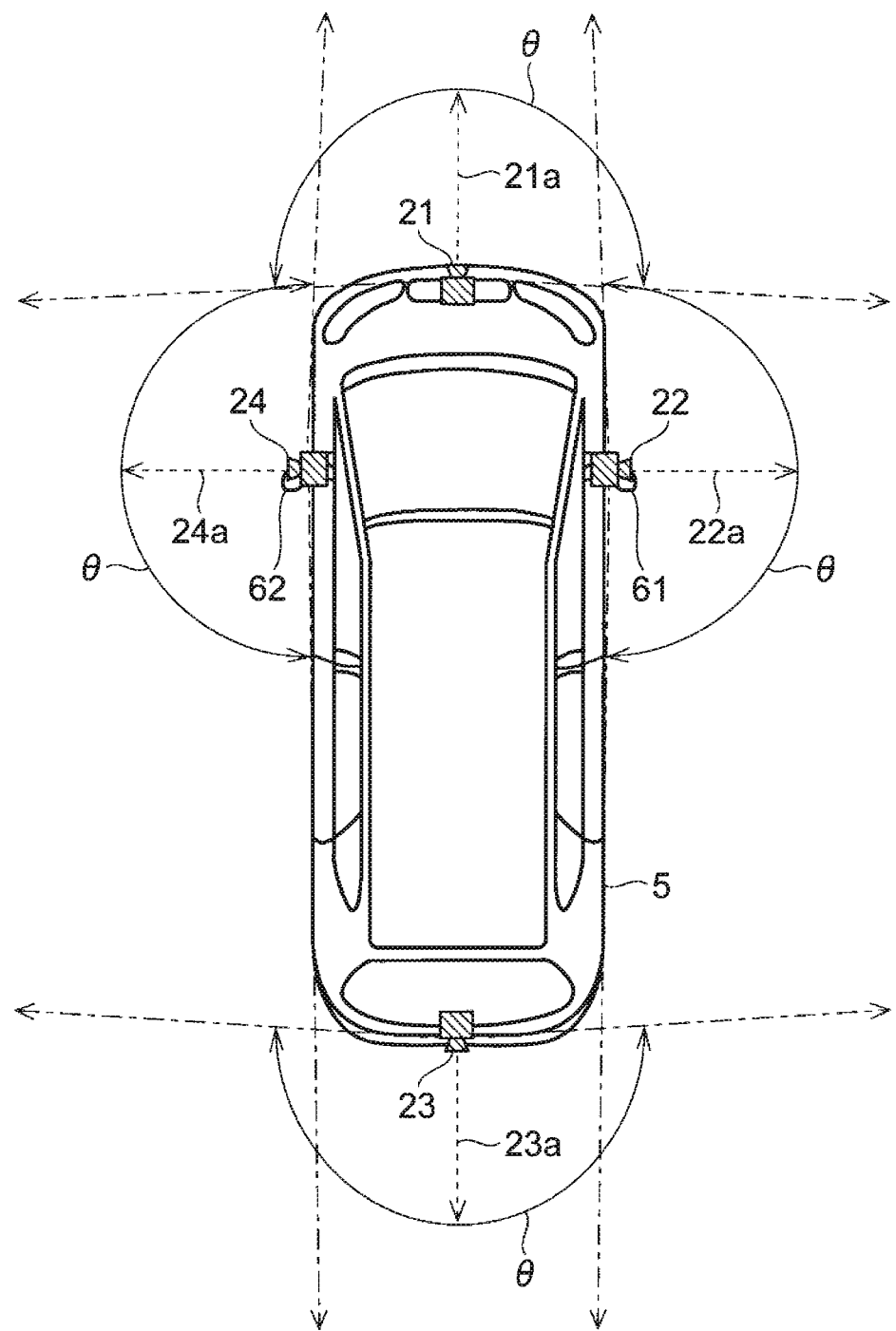
FIG. 2 is a view illustrating positions on a vehicle where vehicle-mounted cameras are placed.

The imaging unit 2 is provided for monitoring the condition in the surrounding area of the vehicle. In the present embodiment, the imaging unit 2 includes, for example, four vehicle-mounted cameras 21 to 24. FIG. 2 is a view illustrating positions on the vehicle 5 where the vehicle-mounted cameras 21 to 24 are placed.

The vehicle-mounted camera 21 is installed on the front end of the vehicle 5. Therefore, the vehicle-mounted camera 21 will also referred to as the front camera 21. The optical axis 21a of the front camera 21 extends along the longitudinal direction of the vehicle 5 as seen in a plan view illustrating the vehicle as seen from the above. The front camera 21 images the area in front of the vehicle 5. The vehicle-mounted camera 23 is installed on the rear end of the vehicle 5. Therefore, the vehicle-mounted camera 23 will also be referred to as the back camera 23. The optical axis 23a of the back camera 23 extends along the longitudinal direction of the vehicle 5 as seen in a plan view illustrating the vehicle as seen from the above. The back camera 23 images the area behind the vehicle 5. Although it is preferable that the installation positions of the front camera 21 and the back camera 23 be at the center in the width direction of the vehicle 5, the front camera and the back camera may be slightly deviated to the left or the right from the center in the width direction.

The vehicle-mounted camera 22 is installed on a right door mirror 61 of the vehicle 5. Therefore, the vehicle-mounted camera 22 will also be referred to as the right side camera 22. The optical axis 22a of the right side camera 22 extends along the width direction of the vehicle 5 as seen in a plan view illustrating the vehicle as seen from the above. The right side camera 22 images the area on the right side of the vehicle 5. The vehicle-mounted camera 24 is installed on a left door mirror 62 of the vehicle 5. Therefore, the vehicle-mounted camera 24 will also be referred to as the left side camera 24. The optical axis 24a of the left side camera 24 extends along the width direction of the vehicle 5 as seen in a plan view illustrating the vehicle as seen from the above. The left side camera 24 images the area on the left side of the vehicle 5.

However, in the case where the vehicle 5 is a so-called door-mirror-less vehicle, the right side camera 22 may be installed in the vicinity of the pivot (hinge part) of the right side door, without interposing a door mirror therebetween, and the left side camera 24 may be installed in the vicinity of the pivot (hinge part) of the left side door, without interposing a door mirror therebetween.

As lenses for the vehicle-mounted cameras 21 to 24, for example, fisheye lenses are used. Each of the vehicle-mounted cameras 21 to 24 has an angle of view θ equal to or greater than 180 degrees in the horizontal direction. Therefore, it is possible to image the area around the vehicle 5 in the horizontal direction.

Referring to FIG. 1 again, the sensor unit 3 includes a plurality of sensors for detecting information related to the vehicle 5 equipped with the vehicle-mounted cameras 21 to 24. In information related to the vehicle 5, information on the vehicle and information on the surrounding area of the vehicle may be included. In the present embodiment, in the sensor unit 3, for example, seat sensors for detecting the seats of the occupants of the vehicle, a vibration sensor for detecting vibration of the vehicle, a tilt sensor for detecting the tilt of the vehicle, obstacle sensors for detecting people, animals, vehicles, and other objects in the surrounding area of the vehicle, and so on are included.

The image processing unit 4 is a device for processing images acquired by the vehicle-mounted cameras 21 to 24. In the present embodiment, for example, the image processing unit 4 is provided on the vehicle 5. However, the image processing unit 4 may be provided at the report center 7. The image processing unit 4 acquires images acquired by the imaging unit 2, via the accident report device 1, and processes the images.

The image processing unit 4 generates images for display by processing images acquired by the imaging unit 2. In the present embodiment, the image processing unit 4 is configured as a hardware circuit capable of a variety of image processing. In the present embodiment, the image processing unit 4 generates synthetic images showing the surrounding area of the vehicle 5 as seen from virtual viewpoints, on the basis of images acquired by the vehicle-mounted cameras 21 to 24 mounted on the vehicle 5. Further, the image processing unit 4 generates images for display to be displayed at the report center 7, on the basis of the synthetic images. Details of the method of generating synthetic images will be described below.

The report center 7 has a terminal 8 for receiving images for display which are output from the accident report device 1. Examples of the terminal 8 include a stationary information terminal such as a personal computer, a portable terminal such as a smart phone, and so on. The terminal 8 includes a display unit 81 for displaying images for display received from the accident report device 1 on a screen.

2. Details of Accident Report Device

The accident report device 1 is configured to include a control unit 11 and a storage unit 12.

The control unit 11 is a so-called microcomputer including a CPU (Central Processing Unit), a RAM (Random Access Memory), and a ROM (Read Only Memory) (not shown in the drawings). The control unit 11 performs information processing and information transmission and reception on the basis of a program stored in the storage unit 12. The control unit 11 is connected to the imaging unit 2, the sensor unit 3, the image processing unit 4, and the report center 7 by wire or wirelessly.

The control unit 11 includes an image acquiring unit 111, an information acquiring unit 112, and an image control unit 113. The CPU performs arithmetic processing according to a program, whereby the functions of the individual components of the control unit 11 are implemented.

The image acquiring unit 111 acquires images acquired by the vehicle-mounted cameras 21 to 24. In the present embodiment, the number of vehicle-mounted cameras 21 to 24 is four, and the image acquiring unit 111 acquires images acquired by the individual vehicle-mounted cameras 21 to 24. In the case of performing image processing on images, the images acquired via the image acquiring unit 111 are transmitted to the image processing unit 4.

The information acquiring unit 112 acquires a variety of information on the vehicle 5. For example, the information acquiring unit 112 acquires the seat occupant information of the occupant of the vehicle 5 from the seat sensors of the sensor unit 3. Also, for example, the information acquiring unit 112 acquires information on an impact applied to the vehicle 5, from the vibration sensor of the sensor unit 3. Also, for example, the information acquiring unit 112 acquires information on the posture of the vehicle 5 from the tilt sensor of the sensor unit 3.

The image control unit 113 controls image processing which is performed by the image processing unit 4. For example, the image control unit 113 issues instructions related to various parameters necessary to generate synthetic images and images for display, to the image processing unit 4. Also, the image control unit 113 performs control for displaying images for display based on synthetic images generated on the basis of acquired images and showing the surrounding area of the vehicle 5 as seen from a virtual viewpoint and including the external appearance of the vehicle 5, on the terminal 8 at the report center 7. Display of synthetic images on the terminal 8 is performed by transmitting a display control signal to the terminal 8. In the following description, images for display based on synthetic images which are displayed on the display unit 81 of the terminal 8 will also referred to simply as synthetic images.

The storage unit 12 is a non-volatile memory such as a flash memory, and stores a variety of information. The storage unit 12 stores, for example, programs which are firmware, a variety of data to be used in the image processing unit 4 for generating synthetic images and images for display. Also, the storage unit 12 stores a variety of data necessary for the image acquiring unit 111, the information acquiring unit 112, and the image control unit 113 to perform processing.

3. Generation of Synthetic Images

Figure 3:
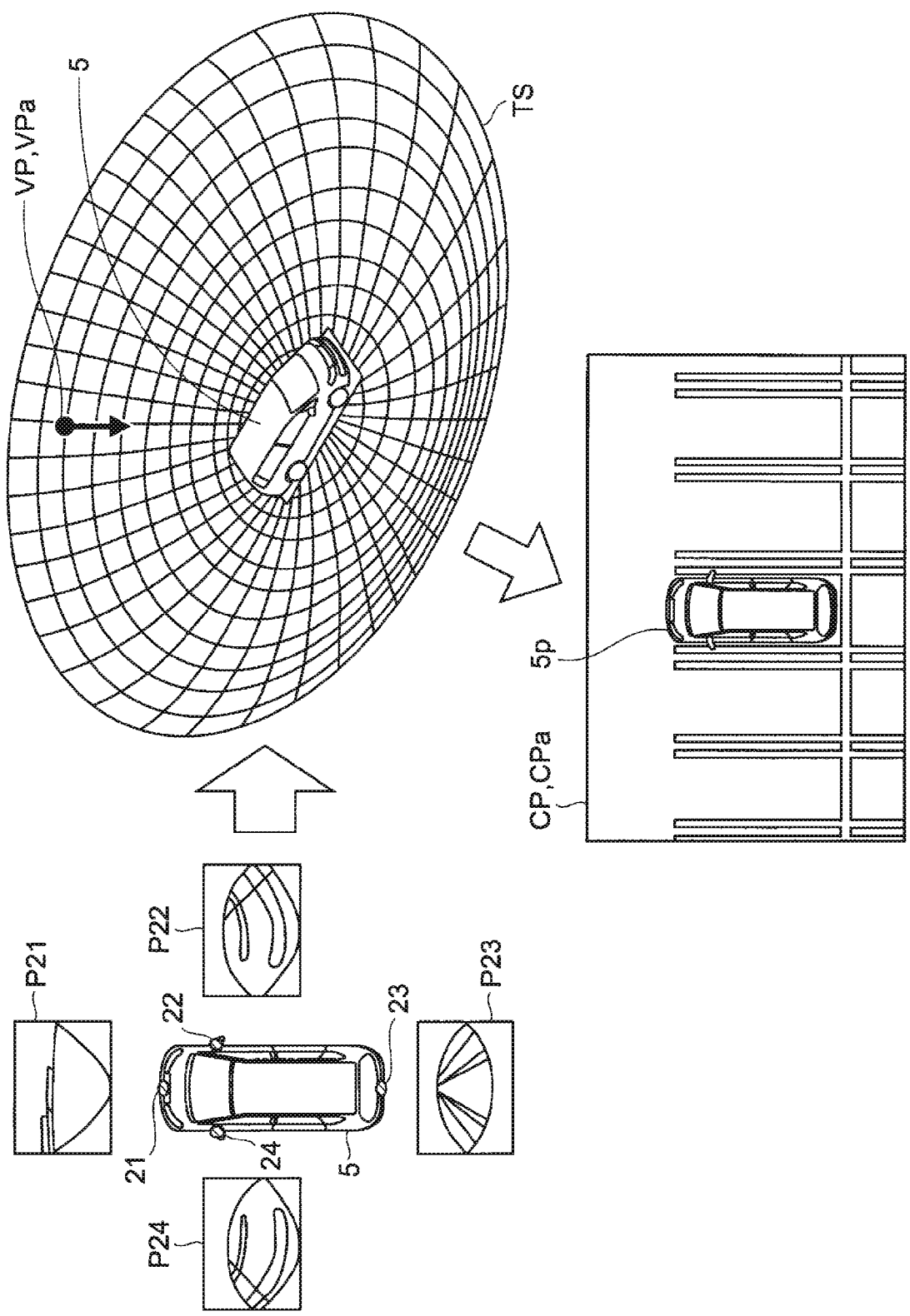
FIG. 3 is a view for explaining a method of generating a synthetic image showing the surrounding area of the vehicle.

The method by which the image processing unit 4 generates synthetic images showing the surrounding area of the vehicle 5 as seen from virtual viewpoints will be described. FIG. 3 is a view for explaining the method of generating synthetic images CP showing the surrounding area of the vehicle 5.

By the front camera 21, the right side camera 22, the back camera 23, and the left side camera 24, four images P21 to P24 showing the front side, the right side, the rear side, and the left side of the vehicle 5 respectively are acquired at the same time. In the four images P21 to P24, data on all over the surrounding area of the vehicle 5 is included. The image processing unit 4 acquires the four images P21 to P24 via the image acquiring unit 111.

The image processing unit 4 projects the data included in the four images P21 to P24 (the values of the individual pixels), onto a projection plane TS which is a three-dimensional curved plane in a virtual three-dimensional space. The projection plane TS has, for example, a substantially hemispherical shape (a bowl shape), and the center thereof (the bottom part of the bowl) is determined as the position of the vehicle 5.

Onto an area of the projection plane TS on the outside of the area for the vehicle 5, the image data is projected. The correspondence relation between the positions of the individual pixels which are included in the images P21 to P24 and the positions of the individual pixels on the projection plane TS is determined in advance. Table data representing that correspondence relation is stored in the storage unit 12. The values of the individual pixels on the projection plane TS may be determined on the basis of the above-mentioned correspondence relation and the values of the individual pixels included in the images P21 to P24.

Next, the image processing unit 4 sets a virtual viewpoint VP in the three-dimensional space under the control of the image control unit 113. The virtual viewpoint VP is defined by a viewpoint position and a sight line direction. The image processing unit 4 may set a virtual viewpoint VP having an arbitrary viewpoint position and an arbitrary sight line direction, in the three-dimensional space. The image processing unit 4 extracts data projected onto an area of the projection plane TS included in the field of view as seen from the set virtual viewpoint VP, as an image. In this way, the image processing unit 4 generates synthetic images as seen from arbitrary virtual viewpoints VP.

For example, as shown in FIG. 3, in the case of assuming a virtual viewpoint VPa defined by a viewpoint position which is right above the vehicle 5 and a sight line direction which is a straight downward direction, it is possible to generate a synthetic image (a bird's eye view image) CPa showing the vehicle 5 and the surrounding area of the vehicle 5.

An image 5p of the vehicle 5 in the synthetic image CPa is prepared as data such as a bitmap and is stored in the storage unit 12, in advance. When the synthetic image CPa is generated, the data of the image 5p of the vehicle 5 having a shape according to the viewpoint position and the sight line direction defining the virtual viewpoint VP of the synthetic image is read out, and is included in the synthetic image CPa.

As described above, the image processing unit 4 may generate realistic synthetic images CPa, using the virtual three-dimensional projection plane TS. Further, it is possible to check the surrounding area of the vehicle 5, using each synthetic image CP generated on the basis of a plurality of images acquired by the plurality of vehicle-mounted cameras 21 to 24 mounted on the vehicle 5 and showing the surrounding area of the vehicle 5.

Figure 4:
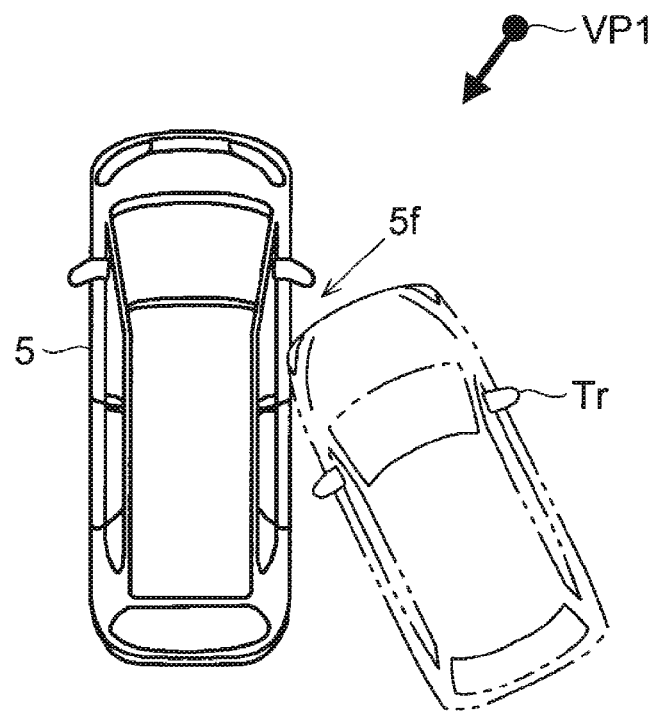
FIG. 4 is an explanatory view illustrating a situation in which the vehicle is subjected to an impact when a vehicle accident occurs.

4. Examples of Vehicle Accident Reporting of Accident Report Device 4-1. First Example FIG. 4 is an explanatory view illustrating a situation in which the vehicle 5 is subjected to an impact when a vehicle accident occurs. As shown in FIG. 4, in the present embodiment, for example, it is assumed that a vehicle accident, i.e. collision of another vehicle Tr with the vehicle 5 has occurred. The collision position is, for example, the right front door 5f of the vehicle 5. The condition in the surrounding area of the vehicle may be acquired by controlling the vehicle-mounted cameras 21 to 24 such that the vehicle-mounted cameras image the surrounding area of the vehicle. The control unit 11 of the accident report device 1 transmits an instruction for instructing the vehicle-mounted cameras 21 to 24 to image the surrounding area of the vehicle, to the imaging unit 2. The control unit 11 acquires the images acquired by the vehicle-mounted cameras 21 to 24, via the image acquiring unit 111, and stores the images in the storage unit 12.

The collision position and collision direction of the vehicle Tr with respect to the vehicle 5 are detected on the basis of the images of the surrounding area of the vehicle acquired by the vehicle-mounted cameras 21 to 24. The control unit 11 detects the collision position and collision direction of the vehicle Tr having collided with the vehicle 5 from the outside. Also, for example, the collision position and the collision direction may be detected on the basis of information on the impact applied to the vehicle 5 acquired from the vibration sensor of the sensor unit 3 by the information acquiring unit 112.

The image control unit 113 controls the image processing unit 4 such that the image processing unit generates synthetic images showing the condition in the surrounding area of the vehicle 5 as seen from a virtual viewpoint, on the basis of the plurality of images of the surrounding area stored in the storage unit 12. More specifically, the image control unit 113 controls the image processing unit 4 such that the image processing unit generates a synthetic image CP1 shown in FIG. 5, on the basis of a virtual viewpoint VP1 (see FIG. 4) defined by a predetermined position on the right front side outside of the vehicle 5 set as a viewpoint position and the line of sight toward the right front door 5f of the vehicle 5 which is the collision position as seen from the viewpoint position.

Figure 5:
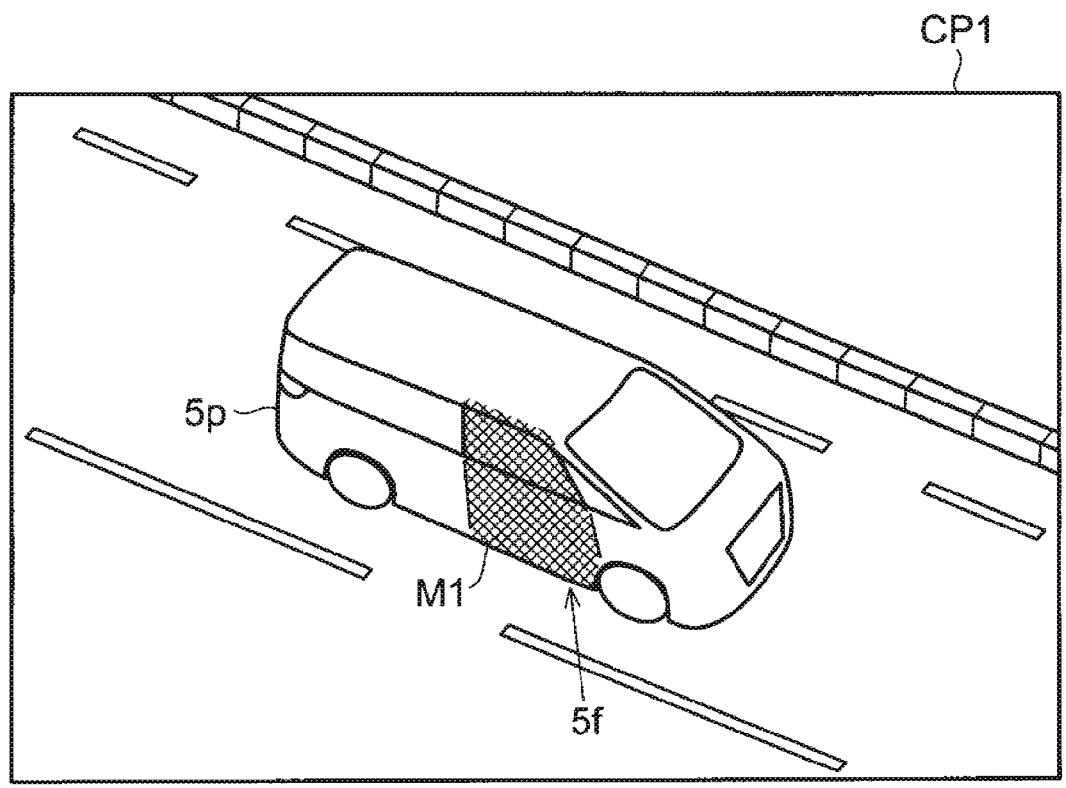
FIG. 5 is a schematic diagram illustrating a synthetic image of a first example which is displayed at a report center.

FIG. 5 is a schematic diagram illustrating the synthetic image CP1 of the first example which is displayed at the report center 7. The synthetic image CP1 is an image showing the surrounding area of the vehicle 5 as seen from above the right front side of the vehicle 5. In the synthetic image CP1, in a synthetic image generated by the image processing unit 4, the image 5p of the vehicle 5 is included. The image control unit 113 performs control for displaying the synthetic image CP1 (an image for display) generated by the image processing unit 4 on the terminal 8 provided at the report center 7. In other words, the image control unit 113 controls the terminal 8 provided at the report center 7 such that the terminal displays the synthetic image CP1 showing the surrounding area of the vehicle 5 as seen from the virtual viewpoint and including the external appearance of the vehicle 5.

Further, the image control unit 113 performs control such that a collision mark M1 indicating the collision position of the vehicle Tr with respect to the vehicle 5 is displayed on the synthetic image CP1. In the present example, the collision position is the right front door 5f of the vehicle 5. Also, in the present example, the number of collision positions is one. However, in the case where the number of collision positions is two or more, as many collision marks as the collision positions are displayed.

Also, the synthetic image CP1 is not limited to the image which is shown in FIG. 5 and shows the surrounding area of the vehicle 5 as seen from above the right front side of the vehicle 5. For example, the synthetic image CP1 may be an image showing the surrounding area of the vehicle 5 as seen from above the right rear side of the vehicle 5, or a bird's eye view image showing the surrounding area of the vehicle 5 as seen from directly above.

Figure 6:
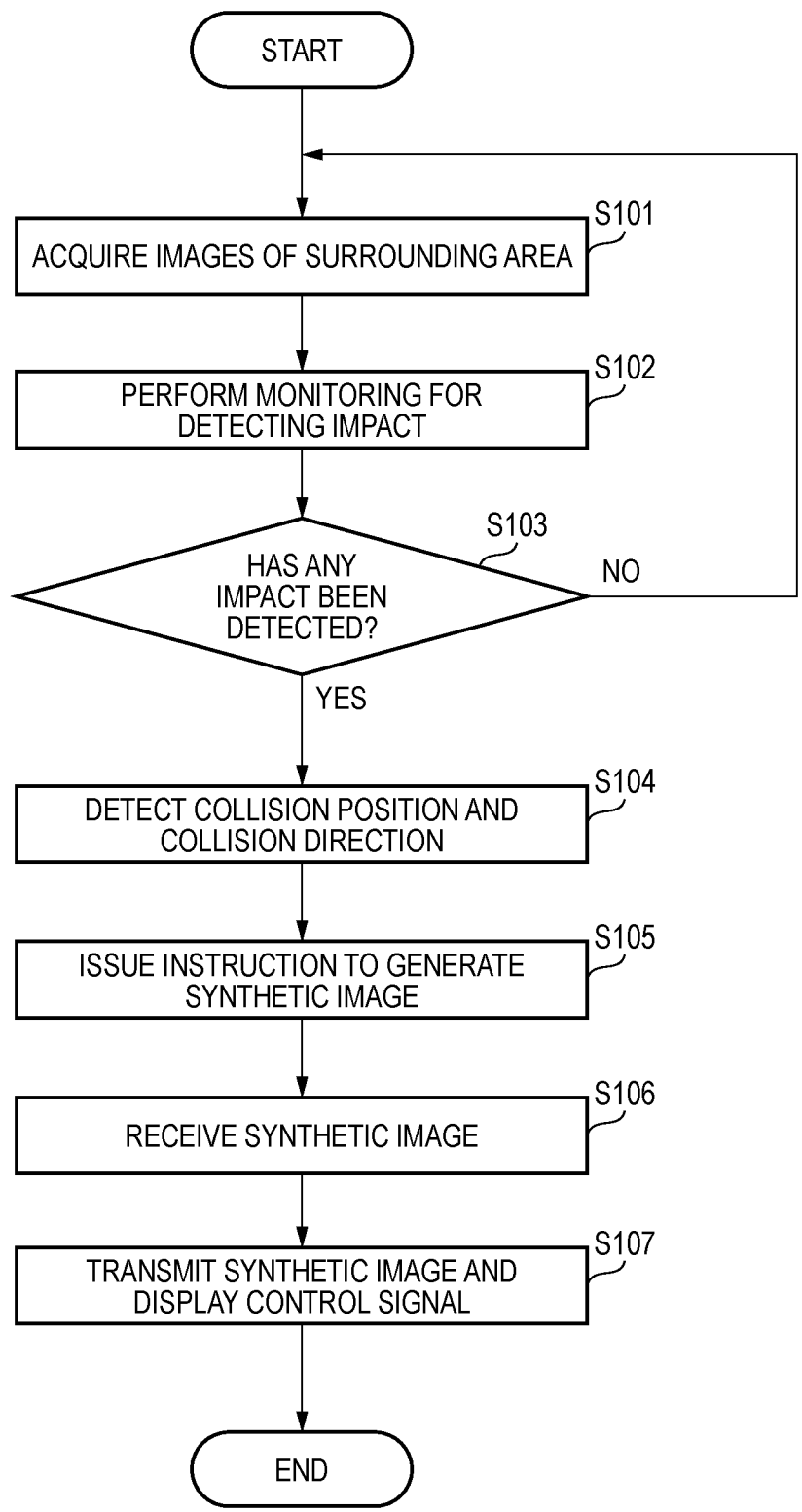
FIG. 6 is a flow chart illustrating an example of a processing flow for displaying a synthetic image of the first example at the report center.

FIG. 6 is a flow chart illustrating an example of a processing flow for displaying a synthetic image CP1 of the first example at the report center 7. The processing for displaying a synthetic image CP1 of the first example at the report center 7 will be described with reference to the processing flow of FIG. 6.

The accident report device 1 is activated, for example, when the ignition of the vehicle 5 is turned on, and starts the processing ("START" in FIG. 6). Subsequently, the accident report device 1 acquires images of the surrounding area of the vehicle (STEP S101). The accident report device 1 acquires images acquired by the vehicle-mounted cameras 21 to 24, via the image acquiring unit 111, and stores the images in the storage unit 12.

Next, the accident report device 1 performs monitoring for detecting an impact which is applied to the vehicle 5 (STEP S102). An impact which is applied to the vehicle 5 is monitored using images of the surrounding area of the vehicle acquired by the vehicle-mounted cameras 21 to 24. Alternatively, monitoring for detecting an impact which is applied to the vehicle 5 may be performed using information acquired from the vibration sensor of the sensor unit 3 by the information acquiring unit 112.

Next, whether any impact on the vehicle 5 has been detected is determined (STEP S103). An impact which is applied to the vehicle 5 is determined on the basis of the degree of approach of another vehicle Tr to the vehicle 5, for example, in the images of the surrounding area of the vehicle. Also, an impact which is applied to the vehicle 5 is determined, for example, on the basis of a detection signal acquired from the vibration sensor of the sensor unit 3 and representing the degree of vibration of the vehicle 5.

In the case where any impact on the vehicle 5 has not been detected ("No" in STEP S103), the processing returns to STEP S101, and acquisition of images of the surrounding area of the vehicle is kept.

In the case where an impact on the vehicle 5 has been detected ("Yes" in STEP S103), the collision position and the collision direction are detected (STEP S104). The control unit 11 detects the collision position and collision direction of another vehicle Tr having collided with the vehicle 5 from the outside, on the basis of the images of the surrounding area of the vehicle. Also, the control unit 11 detects the collision position and the collision direction, on the basis of the information acquired from the sensor unit 3 via the information acquiring unit 112.

Next, the image control unit 113 instructs the image processing unit 4 to generate a synthetic image CP1 (STEP S105). The image processing unit 4 generates a synthetic image CP showing the surrounding area of the vehicle 5 as seen from a virtual viewpoint, and an image for display based on the synthetic image, on the basis of a plurality of images of the surrounding area of the vehicle stored in storage unit 12.

Next, the control unit 11 receives the synthetic image CP1 (the image for display) from the image processing unit 4 (STEP S106). The synthetic image CP1 is stored, for example, in the storage unit 12.

Subsequently, the control unit 11 transmits the synthetic image CP1 (the image for display) to the terminal 8 provided at the report center 7 (STEP S107). At this time, the control unit 11 also transmit a display control signal for displaying the synthetic image CP1, besides the synthetic image CP1, to the terminal 8. In this way, it is possible to display the synthetic image CP1 on the terminal 8. Also, on the synthetic image CP1, a collision mark M1 indicating the collision position of the vehicle Tr with respect to the vehicle 5 is displayed. If the synthetic image CP1 is transmitted to the terminal 8 provided at the report center 7, the processing flow shown in FIG. 6 ends.

As described above, if a vehicle accident occurs, the accident report device 1 of the present example performs control such that a synthetic image CP1 of the surrounding area of the vehicle 5, generated on the basis of images acquired by the vehicle-mounted cameras 21 to 24 and including the external appearance (an image 5p) of the vehicle 5 as seen from a virtual viewpoint is displayed on the terminal 8 provided at the report center 7. As a result, at the report center 7, it is possible to check the image of the surrounding area of the vehicle 5 including the external appearance of the vehicle 5. Therefore, at the report center 7, it is possible to quickly and clearly grasp the condition of the vehicle 5 and the condition in the surrounding area of the vehicle when a vehicle accident occurs.

However, the image control unit 113 may be configured to perform control such that a synthetic image CP1 is generated on the basis of images acquired before application of an impact. In this case, it is preferable to generate a synthetic image CP1 on the basis of images acquired immediately before application of an impact. In this configuration, even if the vehicle-mounted cameras 21 to 24 become unusable due to a vehicle accident, it is possible to generate a synthetic image CP1 and display the synthetic image on the terminal 8 provided at the report center 7. Further, since a synthetic image CP1 may be generated on the basis of images acquired immediately before application of an impact, it is possible to make the condition of the vehicle 5 and the condition in the surrounding area of the vehicle during the occurrence of the vehicle accident, as clear as possible.

Also, a synthetic image CP1 is not limited to the image shown in FIG. 5 and showing the surrounding area of the vehicle 5 as seen from above the right front side of the vehicle 5, and may be switched to another image showing the surrounding area of the vehicle as seen from another direction by the terminal 8 provided at the report center 7. In this case, the control unit 11 transmits a display control signal to instruct the terminal 8 to display icons and the like usable to arbitrarily switch between images, to the terminal 8.

Also, in the present embodiment, the image processing unit 4 is installed on the vehicle 5, and generates synthetic images CP1 in the vehicle 5. However, the image processing unit may be provided at the report center 7 and generate synthetic images at the report center 7. In this case, the accident report device 1 transmits, for example, images acquired by the vehicle-mounted cameras 21 to 24, a variety of information such as various parameters necessary to generate synthetic images and images for display, control signals related to image processing, to the image processing unit provided at the report center 7.

The image control unit 113 performs control on image processing which is performed by the image processing unit provided at the report center 7, by transmitting control signals to the image processing unit provided at the report center 7. Also, the image control unit 113 performs control such that at the report center 7, synthetic images and images for display are generated and are displayed on the terminal 8. Further, the image control unit 113 performs control such that on synthetic images, collision marks indicating collision positions of obstacles such as other vehicles with respect to the vehicle 5 are displayed.

4-2. Second Example

Figure 7:
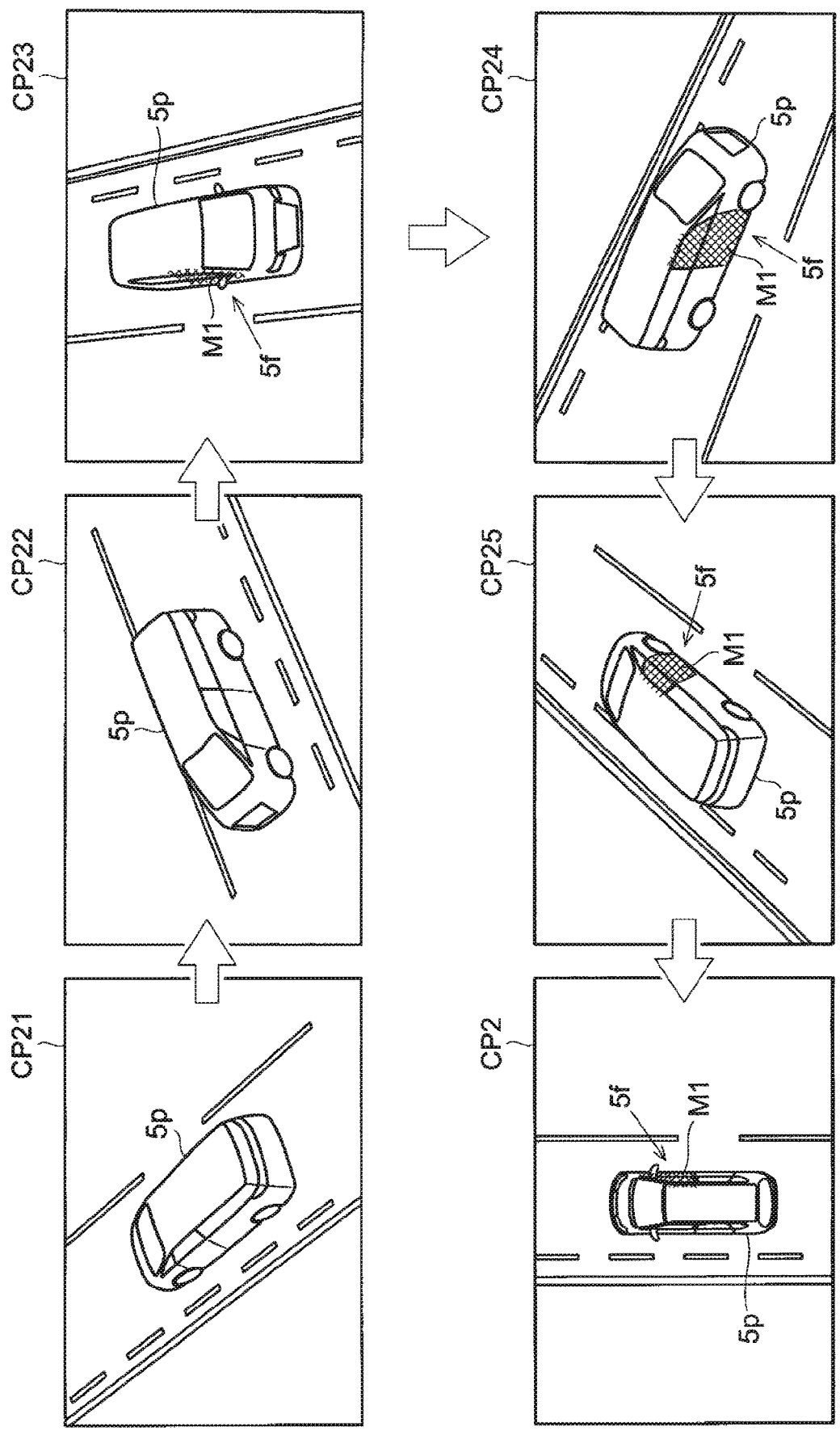
FIG. 7 is a schematic diagram illustrating synthetic images of a second example which are consecutively displayed at the report center.

FIG. 7 is a schematic diagram illustrating synthetic images of a second example which are consecutively displayed at the report center 7. An accident report device 1 of the second example consecutively displays synthetic images CP21 to CP25 of the surrounding area of the vehicle 5 generated along the circumference, on the terminal 8 provided at the report center 7, at the beginning of display of synthetic images CP2.

For example, when the image control unit 113 performs control such that synthetic images CP2, each of which shows the surrounding area of the vehicle 5 and includes the external appearance (an image 5p) of the vehicle 5, are displayed on the terminal 8 provided at the report center 7, it performs control such that the synthetic images CP2 shown in FIG. 7 are first displayed. The synthetic image CP21 is, for example, an image of the surrounding area of the vehicle 5 as seen from above the left rear side of the vehicle 5. Subsequently, the image control unit 113 performs control such that the synthetic image CP22 of the surrounding area of the vehicle 5 as seen from above the left front side of the vehicle 5 is displayed. Next, the image control unit 113 performs control such that the synthetic image CP23 of the surrounding area of the vehicle 5 as seen, for example, from above the substantially front side of the vehicle 5, and the synthetic image CP24 of the surrounding area of the vehicle 5 as seen from above the right front side of the vehicle 5, and the synthetic image CP25 of the surrounding area of the vehicle 5 as seen from above the right rear side of the vehicle 5 are sequentially displayed. Finally, the image control unit 113 performs control such that synthetic images CP2 which are bird's eye view images showing the surrounding area of the vehicle 5 are displayed. Also, the image control unit 113 performs control such that in the case where any one of the synthetic images CP21 to CP25 and the synthetic images CP2 shows the position of collision of the obstacle such as another vehicle with respect to the vehicle 5, a collision mark M1 is displayed at the corresponding position.

In the present example, the five synthetic images CP21 to CP25 have been described as synthetic images of the surrounding area of the vehicle 5 acquired along the circumference. However, the number of synthetic images of the surrounding area of the vehicle 5 which are acquired along the circumference is not limited to five, and may be smaller or larger than five. Also, in the present example, the synthetic images CP21 to CP25 of the surrounding area of the vehicle 5 acquired along the circumference are displayed clockwise with respect to the image 5p of the vehicle 5 in a synthetic image CP1; however, they may be displayed counterclockwise.

According to the configuration of the accident report device 1 of the present example, it is possible to easily check the condition in the surrounding area of the vehicle 5 along the circumference at the beginning of display of synthetic images on the terminal 8 provided at the report center 7. Therefore, when a vehicle accident occurs, at the report center 7, more effectively, it is possible to quickly and clearly grasp the condition of the vehicle 5 and the condition in the surrounding area of the vehicle.

4-3. Third Example

Figure 8:
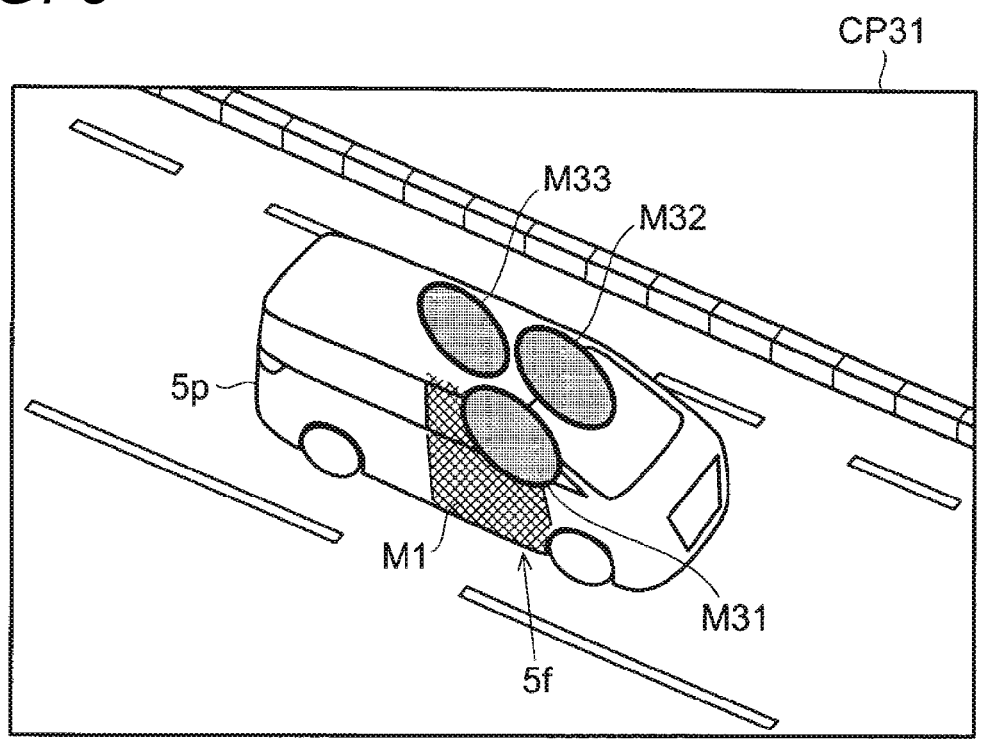
FIG. 8 is a schematic diagram illustrating a synthetic image (example 1) of a third example which is displayed at the report center.
Figure 9:
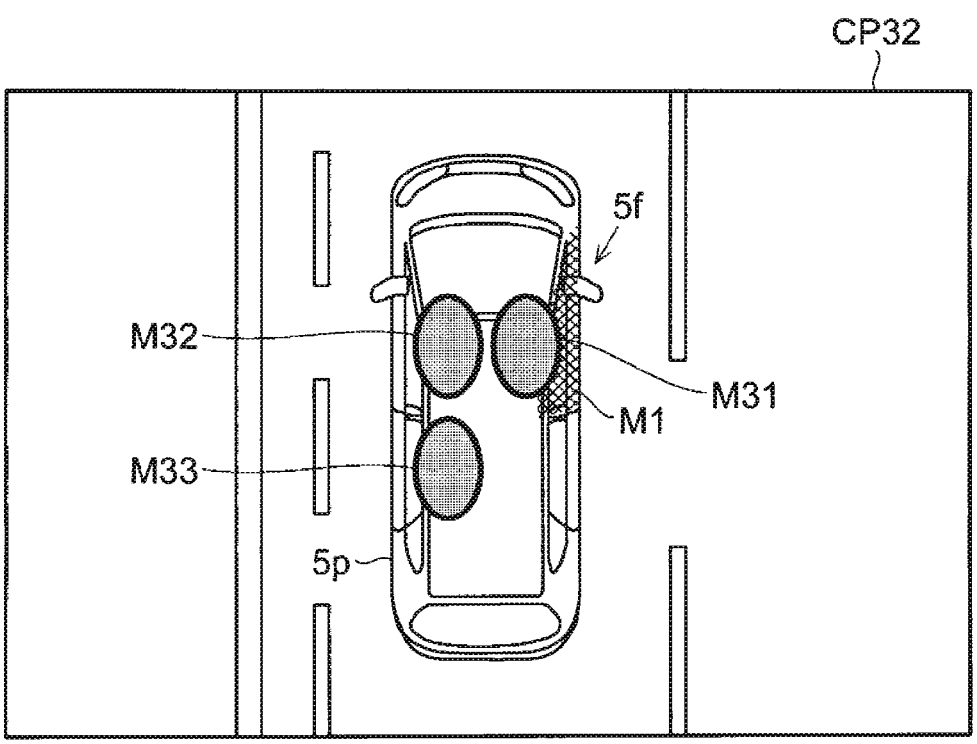
FIG. 9 is a schematic diagram illustrating another synthetic image (example 2) of the third example which is displayed at the report center.

FIG. 8 is a schematic diagram illustrating a synthetic image CP31 (a first example) of a third example which is displayed at the report center 7. The synthetic image CP31 is an image of the surrounding area of the vehicle 5 as seen from above the right front side of the vehicle 5. FIG. 9 is a schematic diagram illustrating a synthetic image CP32 (a second example) of the third example which is displayed at the report center 7. The synthetic image CP32 is a bird's eye view image of the surrounding area of the vehicle 5 as seen from directly above the vehicle 5. An accident report device 1 of the third example performs controls such that on the terminal 8 provided at the report center 7, seat position marks M31, M32, and M33 indicating the positions of the seats of the occupants of the vehicle 5 are displayed on each of the synthetic images CP31 and CP32.

The information acquiring unit 112 acquires the seat information of the occupants of the vehicle 5 from the seat sensors of the sensor unit 3. It is preferable to regularly acquire seat information at predetermined timings. In this case, it is possible to grasp movement of the occupants in the vehicle. In the present example, for example, the seat positions of the occupants of the vehicle 5 are three, i.e. the driver's seat (M31), the passenger seat (M32), and the seat (M33) right behind the passenger seat. Therefore, the image control unit 113 includes an image 5p of the vehicle 5, and seat position marks M31, M32, and M33 indicating the seat positions, in each of the synthetic images CP31 and CP32.

According to the configuration of the accident report device 1 of the present example, on the terminal 8 provided at the report center 7, it is possible to easily and intuitively check the seat positions of the occupants of the vehicle 5. Further, at the report center 7, it is possible to quickly and clearly grasp the seat positions of the occupants of the vehicle 5 when a vehicle accident occurs, and this information gives an effective guideline in rescue work.

4-4. Fourth Example

Figure 10:
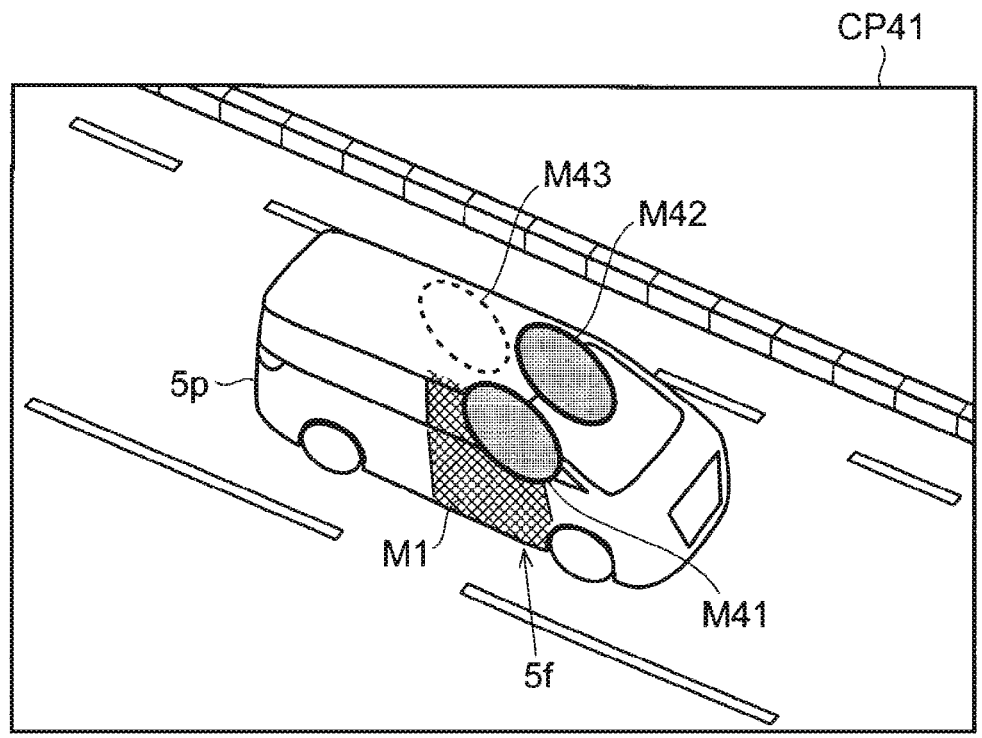
FIG. 10 is a schematic diagram illustrating a synthetic image (example 1) of a fourth example which is displayed at the report center.
Figure 11:
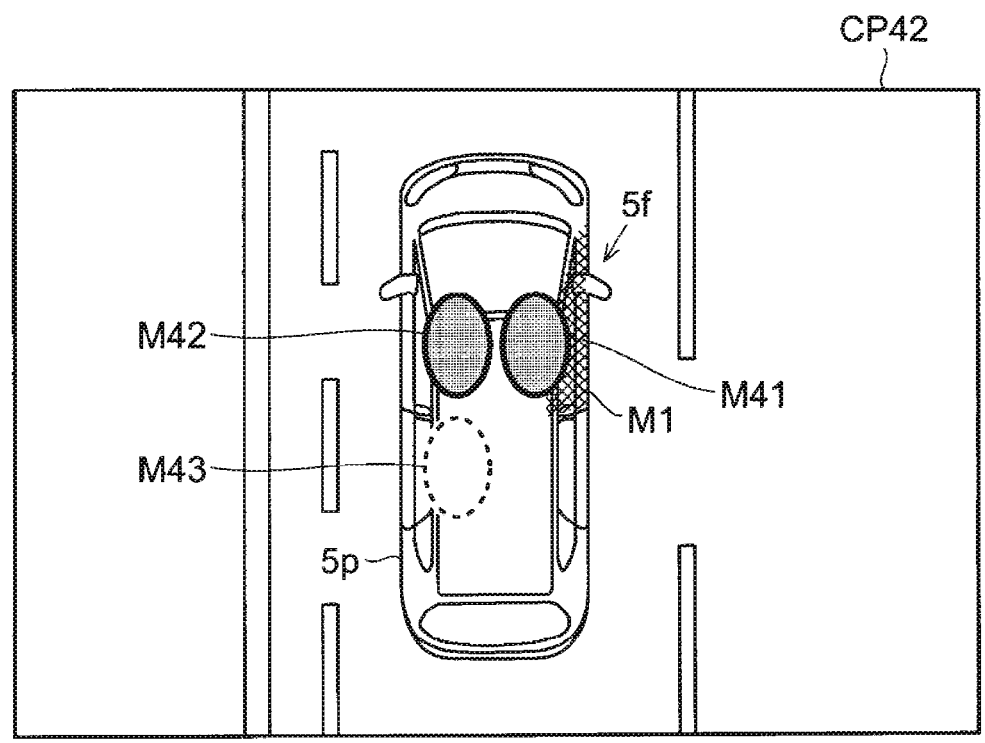
FIG. 11 is a schematic diagram illustrating another synthetic image (example 2) of the fourth example which is displayed at the report center.

FIG. 10 is a schematic diagram illustrating a synthetic image CP41 (a first example) of a fourth example which is displayed at the report center 7. The synthetic image CP41 is an image of the surrounding area of the vehicle 5 as seen from above the right front side of the vehicle 5. FIG. 11 is a schematic diagram illustrating a synthetic image CP42 (a second example) of the fourth example which is displayed at the report center 7. The synthetic image CP42 is a bird's eye view image of the surrounding area of the vehicle 5 as seen from directly above the vehicle 5. An accident report device 1 of the fourth example performs control such that on the terminal 8 provided at the report center 7, seat position marks M41, M42, and M43 indicating the positions of the seats of the occupants of the vehicle 5 are displayed on each of the synthetic images CP41 and CP42.

The information acquiring unit 112 acquires the seat information of the occupants of the vehicle 5 from the seat sensors of the sensor unit 3. It is preferable to regularly acquire seat information at predetermined timings. Also, the image acquiring unit 111 acquires information related to the impact applied to the vehicle 5. The impact applied to the vehicle 5 is determined on the basis of the degree of approach of another vehicle or the like to the vehicle 5, for example, in images of the surrounding area of the vehicle. Also, the impact applied to the vehicle 5 is determined, for example, on the basis of a detection signal representing the degree of vibration of the vehicle 5 acquired from the vibration sensor of the sensor unit 3.

In the case where the seat information after the impact is different from the seat information before the impact, the image control unit 113 changes the display forms of the seat position marks on each of the synthetic images CP41 and CP42. In the present example, for example, the seat positions of the occupants of the vehicle 5 are three, i.e. the driver's seat (M41), the passenger seat (M42), and the seat (M43) right behind the passenger seat. Since the seat information of the driver's seat (M41) and the passenger seat (M42) after the impact is the same as the seat information before the impact, each seat position mark is displayed in a form such as a solid line. Meanwhile, since the seat information of the seat (M43) right behind the passenger seat after the impact is different from the seat information before the impact, the seat position mark is displayed in a form, such as a broken line, different from that of the driver's seat (M41) and the passenger seat (M42).

According to the configuration of the accident report device 1 of the present example, on the terminal 8 provided at the report center 7, it is possible to easily and intuitively check the seat positions of the occupants of the vehicle 5 before and after application of an impact. Therefore, when a vehicle accident occurs, at the report center 7, it is possible to quickly and clearly grasp the seat information of the occupants including movement of the occupants of the vehicle 5 attributable to the impact, and this information gives a guideline in rescue work.

4-5. Fifth Example

Figure 12:
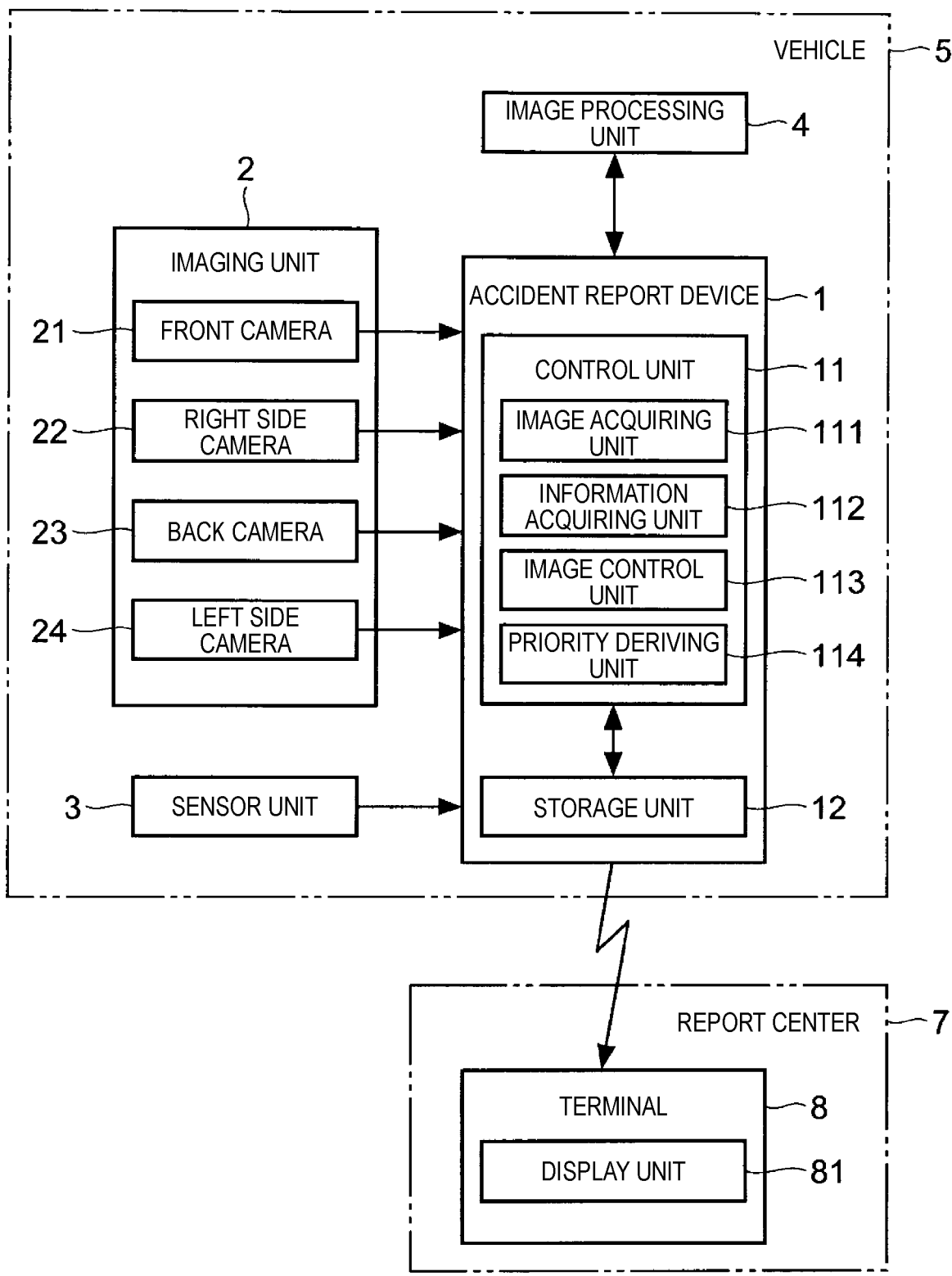
FIG. 12 is a block diagram illustrating the configuration an accident report device of a fifth example.

FIG. 12 is a block diagram illustrating the configuration of an accident report device 1 of a fifth example. In the accident report device 1 of the fifth example, the control unit 11 includes a priority deriving unit 114. The priority deriving unit 114 derives the rescue priorities of the occupants of the vehicle 5 on the basis of the position subjected to the impact.

Figure 13:
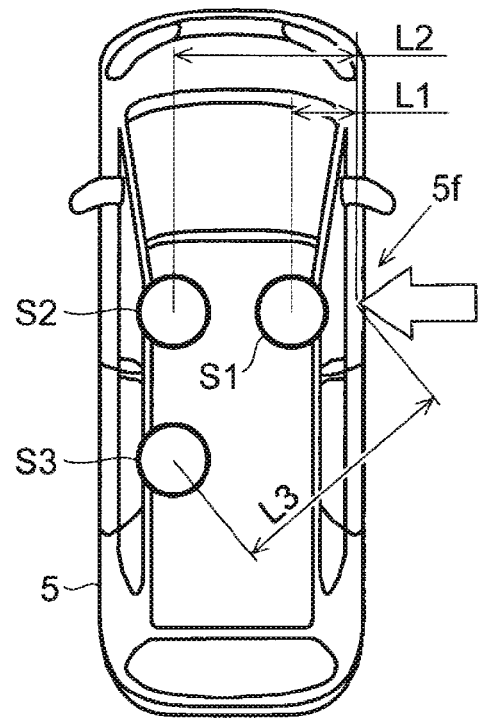
FIG. 13 is a view for explaining a method of deriving rescue priorities according to the fifth example.

FIG. 13 is a view for explaining a method of deriving rescue priorities according to the fifth example. The position of the vehicle 5 subjected to the impact is, for example, the right front door 5f of the vehicle 5. The priority deriving unit 114 acquires the seat information of the occupants of the vehicle 5 from the seat sensors of the sensor unit 3 via the information acquiring unit 112. In the present example, for example, the seat positions of the occupants of the vehicle 5 are three, i.e. the driver's seat S1, the passenger seat S2, and the seat S3 right behind the passenger seat. The priority deriving unit 114 derives the distance L1 from the right front door 5f subjected to the impact to the driver's seat S1, the distance L2 from the right front door to the passenger seat S2, and the distance L3 from the right front door to the seat S3. Subsequently, the priority deriving unit 114 sets a higher rescue priority for an occupant closer to the right front door 5f.

Figure 14:
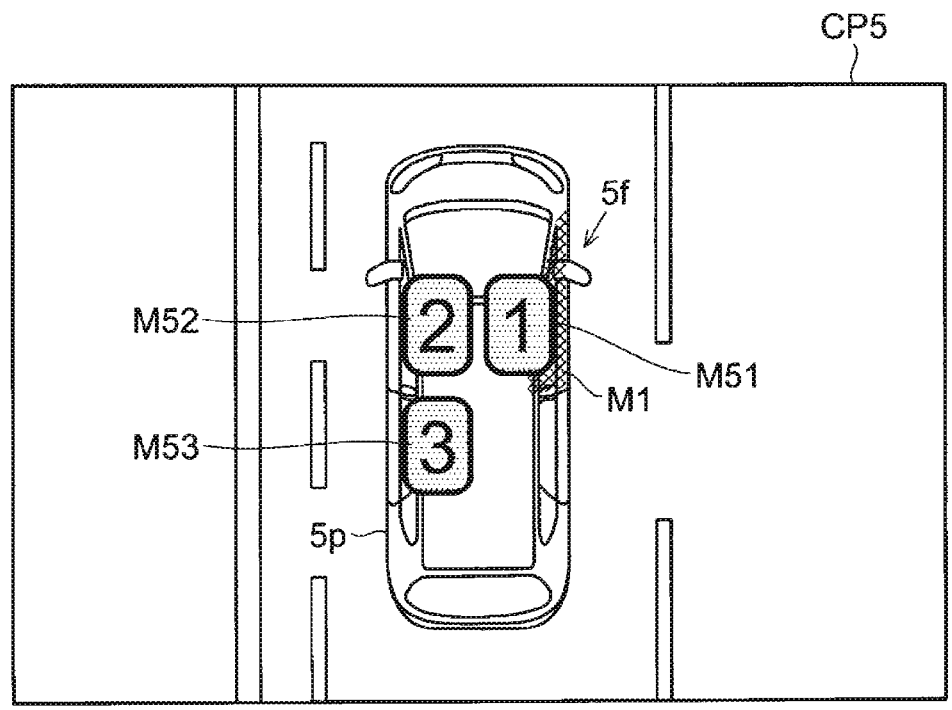
FIG. 14 is a schematic diagram illustrating a synthetic image of the fifth example which is displayed at the report center.

FIG. 14 is a schematic diagram illustrating a synthetic image CP5 of the fifth example which is displayed at the report center 7. As shown in FIG. 14, the image control unit 113 performs control such that the rescue priorities are displayed at the seat positions in the synthetic image CP5. On a seat position mark M51 indicating the driver's seat S1 closest to the right front door 5f which is the position subjected to the impact, "1" representing the first priority is displayed. Further, sequentially from the next closest seat to the right front door 5f, on a seat position mark M52 indicating the passenger seat S2, "2" representing the second priority is displayed, and on a seat position mark M53 indicating the seat S3, "3" representing the third priority is displayed.

In the case where a plurality of positions has been subjected to the impact, the priority deriving unit 114 derives the degree of impact on each position subjected to the impact. The degree of impact on each position subjected to the impact is determined on the basis of the degree of approach of the obstacle such as another vehicle to the vehicle 5, for example, in images of the surrounding area of the vehicle. Also, the degree of impact on each position subjected to the impact is determined, for example, on the basis of a detection signal acquired from the vibration sensor of the sensor unit 3 and representing the degree of vibration of the vehicle 5. Subsequently, the priority deriving unit 114 obtains the product of the degree of impact on each position subjected to the impact and the distance from the corresponding position to the seat position of the occupant, and derives the rescue priorities of the occupants.

The priority deriving unit 114 assigns weights to the rescue priorities of the seat positions of the occupants by any one of various methods which are not limited to the above-described method.

According to the configuration of the accident report device 1 of the present example, on the terminal 8 provided at the report center 7, it is possible to easily check the seat position of the occupant who needs to be first rescued. Also, when a vehicle accident occurs, at the report center 7, it is possible to quickly and clearly grasp the rescue priorities of the occupants of the vehicle 5, and this information gives a guideline in rescue work.

4-6. Sixth Example

Figure 15:
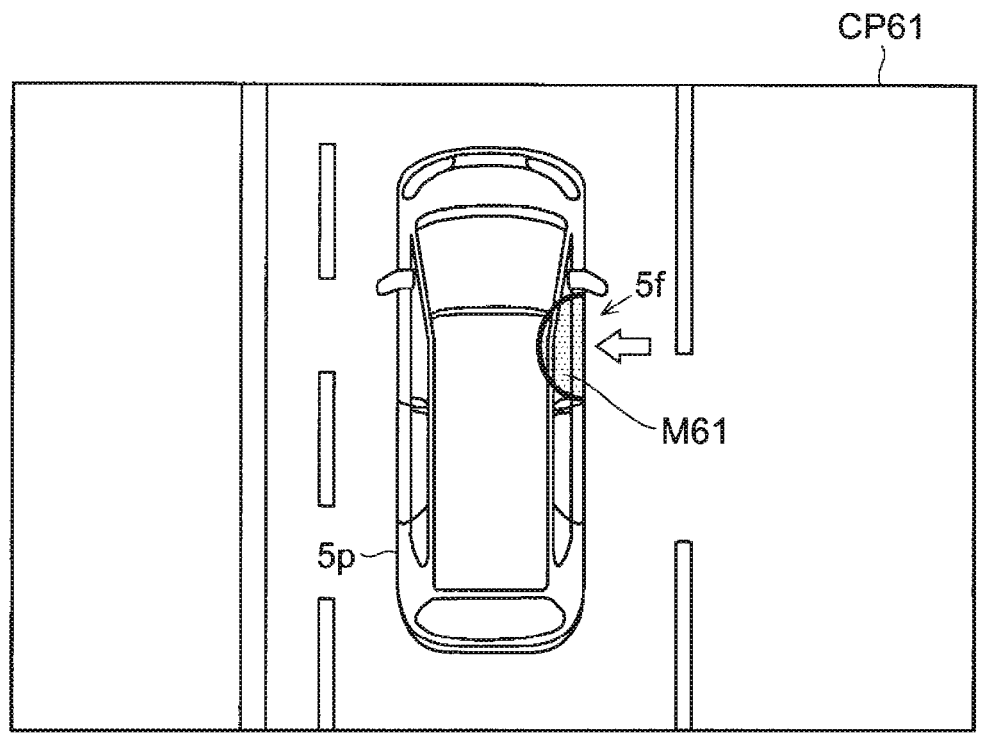
FIG. 15 is a schematic diagram illustrating a synthetic image (example 1) of a sixth example which is displayed at the report center.

FIG. 15 is a schematic diagram illustrating a synthetic image CP61 (a first example) of a sixth example which is displayed at the report center 7. The synthetic image CP61 is a bird's eye view image of the surrounding area of the vehicle 5 as seen from directly above the vehicle 5. An accident report device 1 of the sixth example performs control such that the terminal 8 provided at the report center 7 displays an impact mark M61 representing the state of the impact applied to the vehicle 5, on the synthetic image CP61. In the present example, the position subjected to the impact is, for example, the right front door 5f of the vehicle 5.

The information acquiring unit 112 acquires information on the impact applied to the vehicle 5. The state of the impact applied to the vehicle 5 is determined on the basis of the degree of approach of the obstacle such as another vehicle to the vehicle 5, for example, in images of the surrounding area of the vehicle. Also, the state of the impact applied to the vehicle 5 is determined, for example, on the basis of a detection signal acquired from the vibration sensor of the sensor unit 3 and representing the degree of vibration of the vehicle 5. On the basis of the state of the impact applied to the vehicle 5, for example, whether the impact was such an impact that the body of the vehicle 5 was deeply dented or such an impact that the body was rubbed, the form of the impact mark M61 is changed.

Also, the form of the impact mark is changed on the basis of the direction of the application of the impact. For example, FIG. 15 shows an example in which the impact has been applied to the right front door 5f of the vehicle 5 straight toward the left, as shown by an outlined arrow in FIG. 15. Since the impact has been applied to the right front door 5f straight toward the left, an impact mark M61 has, for example, a semicircular form dented from the right front door 5f into the vehicle 5 (the image 5p) straight toward the left.

Figure 16:
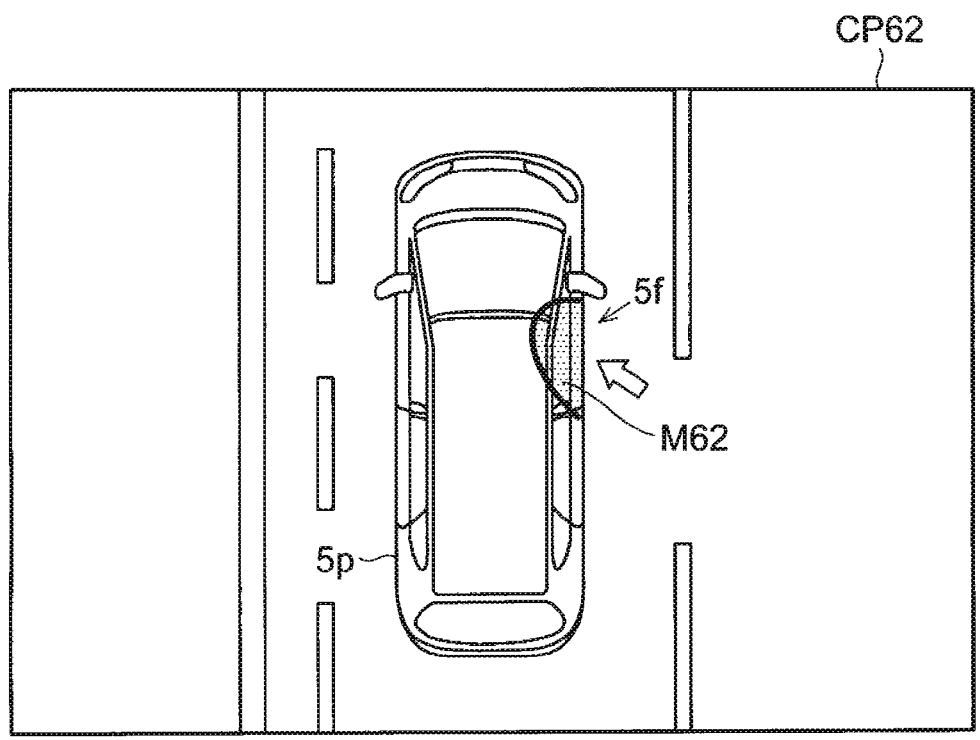
FIG. 16 is a schematic diagram illustrating another synthetic image (example 2) of the sixth example which is displayed at the report center.

FIG. 16 is a schematic diagram illustrating a synthetic image CP62 (a second example) of the sixth example which is displayed at the report center 7. For example, FIG. 16 shows an example in which an impact has been applied to the right front door 5f of the vehicle 5 obliquely from the rear side toward the front side, as shown by an outlined arrow in FIG. 16. Since the impact has been applied to the right front door 5f obliquely from the rear side toward the front side, an impact mark M62 has a semielliptical form dented from the right front door 5f into the vehicle 5 (the image 5p) obliquely toward the front side.

As described above, the image control unit 113 includes the image 5p of the vehicle 5, and the impact mark M61 or M62 representing the state of the impact applied to the vehicle 5, in the synthetic image CP61 or CP62. According to this configuration, on the terminal 8 provided at the report center 7, it is possible to easily and intuitively check the state of an impact applied to the vehicle 5, and the direction of the application of the impact. Also, when a vehicle accident occurs, at the report center 7, it is possible to quickly and clearly grasp the damage of the vehicle 5, and this information gives a guideline in rescue work.

Figure 17:
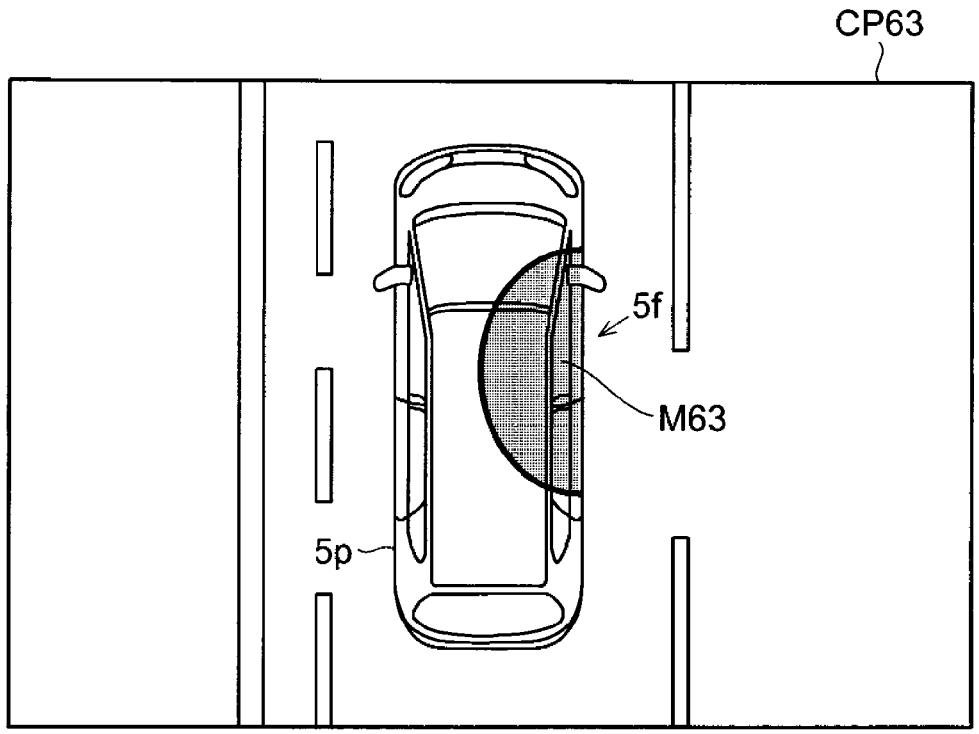
FIG. 17 is a schematic diagram illustrating a further synthetic image (example 3) of the sixth example which is displayed at the report center.

FIG. 17 is a schematic diagram illustrating a synthetic image CP63 (a third example) of the sixth embodiment which is displayed at the report center 7. The image control unit 113 performs control such that the display form of an impact mark M63 in a synthetic image CP63 is changed in accordance with the magnitude of an impact. In other words, for example, the size of the impact mark M63 may be changed in proportion to the magnitude of an impact applied to the vehicle 5. Alternatively, in proportion to the magnitude of an impact applied to the vehicle 5, the color of the impact mark M63 may be changed, for example, in the order of blue, yellow, and red. Also, in proportion to the magnitude of the impact applied to the vehicle 5, for example, the degree of distortion of the shape of the impact mark M63 may be changed.

According to this configuration, on the terminal 8 provided at the report center 7, it is possible to easily and intuitively check the magnitude of an impact applied to the vehicle 5. Also, when a vehicle accident occurs, at the report center 7, it is possible to quickly and clearly grasp the damage of the vehicle 5, and this information gives a guideline in rescue work.

4-7. Seventh Example

Figure 18:
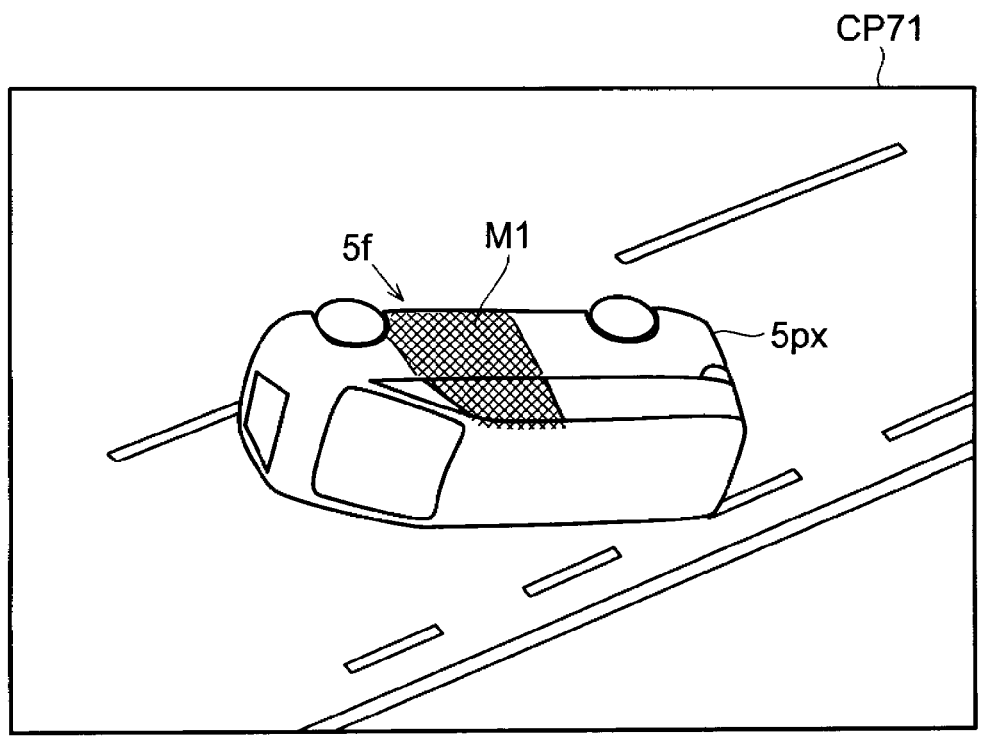
FIG. 18 is a schematic diagram illustrating a synthetic image a seventh example which is displayed at the report center.

FIG. 18 is a schematic diagram illustrating a synthetic image CP71 of a seventh example which is displayed at the report center 7. An accident report device 1 of the seventh example performs control such that the terminal 8 provided at the report center 7 includes an image 5px of the vehicle 5 in a synthetic image CP71. In the present example, for example, it is assumed that the vehicle 5 has overturned due to the impact during a vehicle accident.

The information acquiring unit 112 acquires information on the posture of the vehicle 5. The posture of the vehicle 5 is determined, for example, on the basis of images of the surrounding area of the vehicle. For example, if an image of the surrounding area of the vehicle shows the sky at a wide part and does not show the road, overturn is determined. Also, for example, if it is impossible to normally generate a synthetic image since an image shows the sky at a wide part and does not show the road, overturn is determined. Also, the information acquiring unit 112 may be configured to acquire information on the posture of the vehicle 5 from the tilt sensor of the sensor unit 3. The image control unit 113 performs control such that the display form of an image 5px of the vehicle 5 to be included in a synthetic image CP71 is changed on the basis of the posture of the vehicle 5. In other words, in the synthetic image CP71, an image 5px of the vehicle 5 having overturned may be displayed.

According to the configuration of the accident report device 1 of the present example, on the terminal 8 provided at the report center 7, it is possible to easily and intuitively check the posture of the vehicle 5. Also, when a vehicle accident occurs, at the report center 7, it is possible to quickly and easily grasp a plan for rescuing the occupants of the vehicle 5, and this plan gives a guideline in rescue work.

5. Others

Various technical features disclosed in this specification can be modified variously without departing from the spirit of the technical invention besides the embodiment described above. In other words, it should be understood that the embodiments described above are illustrative and non-restrictive in every respect. It should be understood that the scope of the present invention is defined by the terms of the claims, rather than the description above, and is intended to include any modifications within the scope and meaning equivalent to the terms of the claims. Also, the plurality of embodiment and examples described above may be combined in an acceptable range.

Also, in the above-described embodiment, various functions are implemented in a software wise by computing of the CPUs according to the programs; however, at least some of those functions may be implemented by electrical hardware circuits. Also, conversely, some of functions which are implemented by hardware circuits may be implemented in a software wise.

What is claimed is:

1. An accident report device for reporting accident information to a predetermined report destination when a vehicle is involved in an accident, the accident report device comprising:
   a processor programmed to:
   acquire an image acquired by at least one vehicle-mounted camera mounted on the vehicle;
   acquire seat occupant information of an occupant of the vehicle;
   acquire information related to the vehicle; and
   control a terminal of the report destination such that the terminal displays a synthetic image generated based on the acquired image, the synthetic image showing an area surrounding the vehicle and an external appearance of the vehicle as viewed from a virtual viewpoint, and the synthetic image includes an image of the vehicle and a seat position mark indicating a seat position of the occupant of the vehicle.

2. The accident report device according to claim 1, wherein the processor is programmed to:
   acquire information related to an impact applied to the vehicle, and
   when the seat occupant information after the impact is applied to the vehicle is different from the seat occupant information before the impact is applied to the vehicle, control the terminal such that the seat position mark in the synthetic image is displayed in a different form.

3. The accident report device according to claim 2, wherein the processor is programmed to:
   derive a rescue priority for the occupant based on a position of the vehicle, the position being subjected to the impact, and
   control the terminal such that the rescue priority is displayed at the seat position in the synthetic image.

4. The accident report device according to claim 1, wherein the processor is programmed to:
   acquire information related to a posture of the vehicle, and
   control the terminal such that the image of the vehicle in the synthetic image is displayed in accordance with the posture of the vehicle.

5. An accident report device for reporting accident information to a predetermined report destination when a vehicle is involved in an accident, the accident report device comprising:
   a processor programmed to:
      acquire an image acquired by at least one vehicle-mounted camera mounted on the vehicle;
      acquire seat occupant information of an occupant of the vehicle;
      acquire information related to the vehicle;
      acquire information related to an impact applied to the vehicle; and
      control a terminal of the report destination such that the terminal displays a synthetic image generated based on the acquired image and the image acquired before the impact is applied, the synthetic image showing an area surrounding the vehicle and an external appearance of the vehicle as viewed from a virtual viewpoint.

6. The accident report device according to claim 5, wherein the processor is programmed to control the terminal such that an impact mark representing a state of the impact are included in the synthetic image.

7. The accident report device according to claim 6, wherein the processor is programmed to control the terminal such that the impact mark is displayed in the synthetic image in a different form in accordance with a magnitude of the impact.

8. An accident report method of reporting accident information to a predetermined report destination when a vehicle is involved in an accident, the accident report method comprising:
   acquiring an image acquired by at least one vehicle-mounted camera mounted on the vehicle;
   acquiring seat occupant information of an occupant of the vehicle;
   acquiring information related to the vehicle; and
   controlling a terminal of the report destination such that the terminal displays a synthetic image generated based on the acquired image, the synthetic image showing an area surrounding the vehicle and an external appearance of the vehicle as viewed from a virtual viewpoint, and the synthetic image includes an image of the vehicle and a seat position mark indicating a seat position of the occupant of the vehicle.

\* \* \* \* \*